(12) United States Patent
Sato et al.

(10) Patent No.: US 11,787,399 B2
(45) Date of Patent: Oct. 17, 2023

(54) VEHICLE AND CONTROL APPARATUS THEREOF

(71) Applicant: HONDA MOTOR CO., LTD., Tokyo (JP)

(72) Inventors: Shinya Sato, Wako (JP); Hiroyuki Koibuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 242 days.

(21) Appl. No.: 17/189,510

(22) Filed: Mar. 2, 2021

(65) Prior Publication Data
US 2021/0300345 A1    Sep. 30, 2021

(30) Foreign Application Priority Data

Mar. 26, 2020 (JP) ................................ 2020-056574

(51) Int. Cl.
*B60W 30/09* (2012.01)
*B60W 30/095* (2012.01)
*G08G 1/16* (2006.01)

(52) U.S. Cl.
CPC ........ *B60W 30/09* (2013.01); *B60W 30/0956* (2013.01); *G08G 1/166* (2013.01); *B60W 2552/53* (2020.02); *B60W 2554/404* (2020.02)

(58) Field of Classification Search
CPC .. B60W 30/09; B60W 30/08; B60W 30/0956; B60W 2554/404; B60W 2552/53; G08G 1/166

See application file for complete search history.

(56) References Cited

U.S. PATENT DOCUMENTS

| 9,997,073 B2 | 6/2018 | Kato et al. |
| 10,169,997 B2 | 1/2019 | Kato et al. |
| 2017/0278398 A1 | 9/2017 | Kato et al. |

(Continued)

FOREIGN PATENT DOCUMENTS

| JP | 2010083314 A | * | 4/2010 |
| JP | 2017-174055 A | | 9/2017 |
| JP | 2017-182477 A | | 10/2017 |

OTHER PUBLICATIONS

Machine Translation of Yoshiaki's reference (JP-2017182477-A) (Year: 2017).*

(Continued)

*Primary Examiner* — Tarek Elarabi
(74) *Attorney, Agent, or Firm* — Thomas | Horstemeyer, LLP

(57) ABSTRACT

A control apparatus of a vehicle executes an avoidance operation for avoiding collision with an object that is moving in a direction intersecting a longer direction of the vehicle. In a case where the vehicle is travelling on a first road, and makes a turn toward a first traffic lane of a second road intersecting the first road, the apparatus does not set a vehicle that is travelling on a second traffic lane of the second road that is farther from the vehicle than the first traffic lane, as a target for the avoidance operation, if a predetermined condition is not satisfied, or irrespective of whether or not the predetermined condition is satisfied, and sets a vehicle that is travelling on the first traffic lane, as the target, irrespective of whether or not the predetermined condition is satisfied.

8 Claims, 11 Drawing Sheets

(56) References Cited

U.S. PATENT DOCUMENTS

2018/0247538 A1\* 8/2018 Baek .................. B60W 30/0953
2018/0261096 A1  9/2018 Kato et al.
2021/0046935 A1\* 2/2021 Mizoguchi .......... B60W 50/085

OTHER PUBLICATIONS

Machine Translation of Sawada's reference (JP-2010083314-A) (Year: 2010).\*
Japanese Office Action (with partial translation) for Japanese Patent Application No. 2020-056574 dated Nov. 1, 2021.

\* cited by examiner

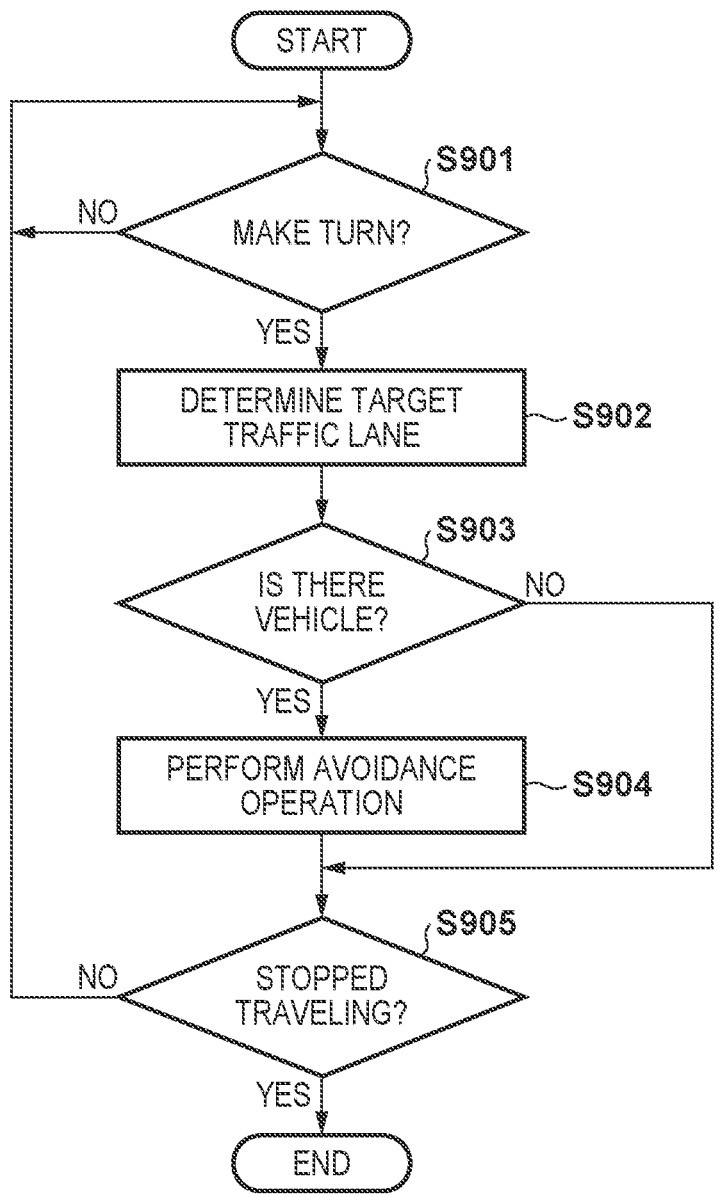

VEHICLE AND CONTROL APPARATUS THEREOF

CROSS-REFERENCE TO RELATED APPLICATION(S)

This application claims priority to and the benefit of Japanese Patent Application No. 2020-056574 filed on Mar. 26, 2020, the entire disclosure of which is incorporated herein by reference.

BACKGROUND OF THE INVENTION

Field of the Invention

The present disclosure relates to a vehicle and a control apparatus thereof.

Description of the Related Art

Functions for monitoring the situation surrounding a vehicle and performing an operation for avoiding collision with another vehicle or a person have been in practical use. Japanese Patent Laid-Open No. 2017-174055 describes that a vehicle that has no possibility of colliding with a vehicle to which a technique described in this literature is applied is not targeted for such a collision avoiding operation.

In Japanese Patent Laid-Open No. 2017-174055, a determination is made on a vehicle having no possibility of colliding with the vehicle to which the technique is applied, based on a grade separated crossing, a center median, a traffic light, a non-preference road, temporary stop, and the like. However, it is not always possible to appropriately make a determination on a target for the collision avoidance operation based on such criteria.

SUMMARY OF THE INVENTION

One aspect of the present disclosure provides a technique for executing a collision avoidance operation in appropriate cases. According to an embodiment of the disclosure, a control apparatus of a vehicle includes a collision avoidance unit configured to execute an avoidance operation for avoiding collision with an object that is moving in a direction intersecting a longer direction of the vehicle. In a case where the vehicle is travelling on a first road, and makes a turn toward a first traffic lane of a second road intersecting the first road, the collision avoidance unit does not set a vehicle that is travelling on a second traffic lane of the second road that is farther from the vehicle than the first traffic lane, as a target for the avoidance operation, if a predetermined condition is not satisfied, or irrespective of whether or not the predetermined condition is satisfied, and sets a vehicle that is travelling on the first traffic lane, as a target for the avoidance operation, irrespective of whether or not the predetermined condition is satisfied.

BRIEF DESCRIPTION OF THE DRAWINGS

FIG. 9 is a flowchart illustrating a control method according to an embodiment of the present disclosure in detail.

DESCRIPTION OF THE EMBODIMENTS

Figure 1:
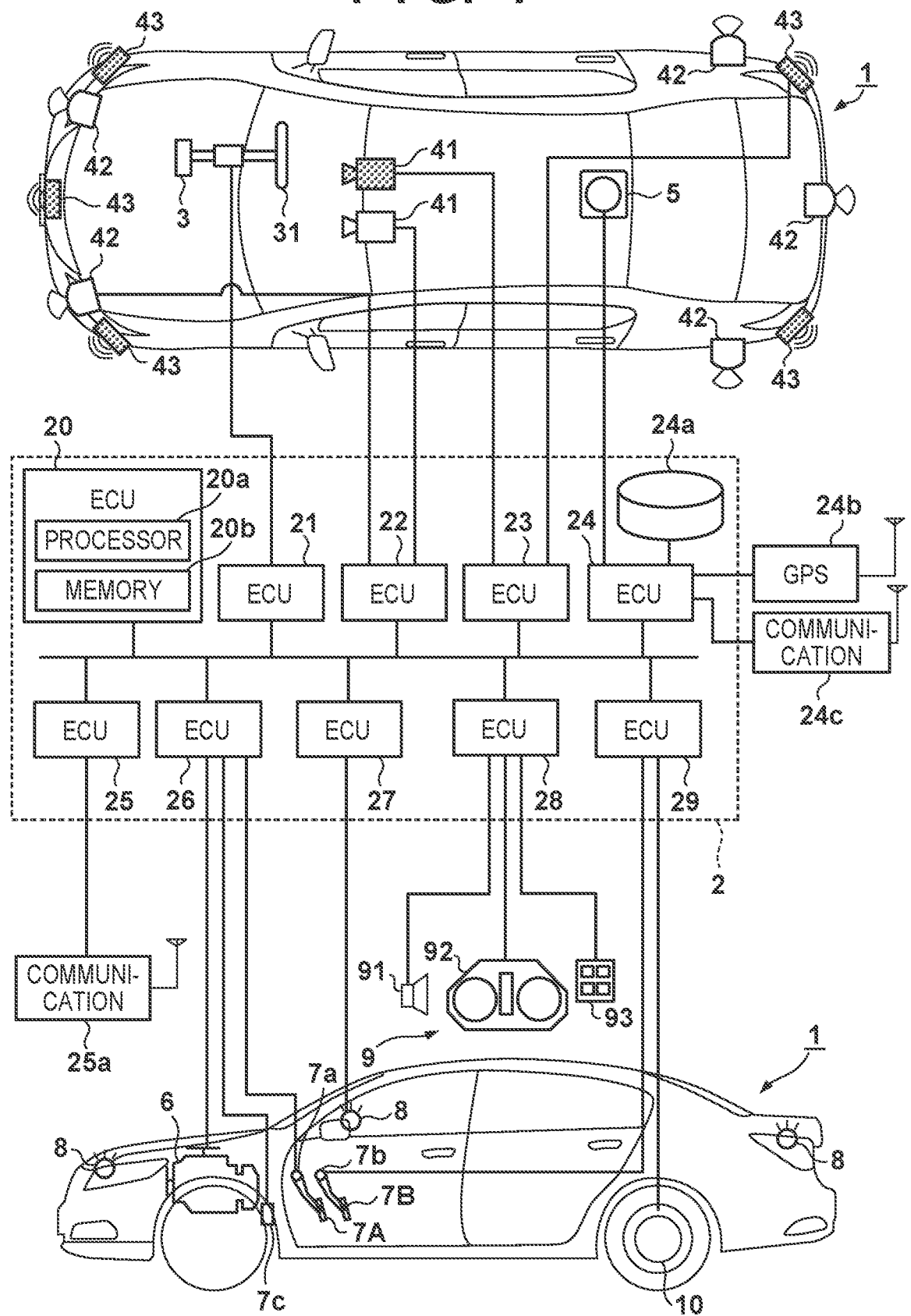
FIG. 1 is a block diagram illustrating a configuration example of a vehicle according to an embodiment of the present disclosure.

Hereinafter, embodiments of the present invention will be described with reference to the attached drawings. In various embodiments, the same reference numerals are given to the same configurations, and redundant description thereof is omitted. In addition, the embodiments can be changed and combined as appropriate.

FIG. 1 is a block diagram of a vehicle 1 according to an embodiment of the present disclosure. FIG. 1 schematically shows the vehicle 1 in a plan view and a side view. The vehicle 1 is a sedan-type four-wheel passenger car, for example. The vehicle 1 may be such a four-wheel vehicle, or may also be a two-wheeler or another type of vehicle.

The vehicle 1 includes a vehicle control apparatus 2 (hereinafter, simply referred to as "control apparatus 2") that controls the vehicle 1. The control apparatus 2 includes a plurality of ECUs 20 to 29 communicably connected by an in-vehicle network. Each of the ECUs includes a processor represented by a CPU, a memory such as a semiconductor memory, an interface to an external device, and the like. The memory stores programs that are executed by the processor, data that is used for processing by the processor, and the like. Each ECU may also include a plurality of processors, a plurality of memories, a plurality of interfaces, and the like. For example, the ECU 20 includes a processor 20a and a memory 20b. As a result of the processor 20a executing an instruction included in a program stored in the memory 20b, processing of the ECU 20 is executed. In place of this, the ECU 20 may also include a dedicated integrated circuit for executing the processing of the ECU 20 such as an ASIC. The same applies to other ECUs.

Functions respectively assigned to the ECUs 20 to 29, and the like will be described below. Note that the number of ECUs and the assigned functions can be designed as appropriate, and they can be broken into smaller pieces than this embodiment, or can be integrated.

The ECU 20 executes control related to automated travelling of the vehicle 1. In automated driving, at least one of steering and acceleration/deceleration of the vehicle 1 is automatically controlled. Automated travelling that is performed by the ECU 20 may include automated travelling (may also be referred to as "automated driving") that does not require a driver's travelling operation and automated travelling (may also be referred to as "driving assist") for assisting a driver's travelling operation.

The ECU 21 controls an electronic power steering apparatus 3. The electronic power steering apparatus 3 includes a mechanism for steering front wheels according to a driver's driving operation (steering operation) on a steering wheel 31. The electronic power steering apparatus 3 also includes a motor that exerts drive force for assisting a steering operation or automatically steering the front wheels, a sensor that detects a steering angle, and the like. When the driving state of the vehicle 1 is an automated driving state, the ECU 21 automatically controls the electronic power steering apparatus 3 according to an instruction from the ECU 20, and controls the direction of forward movement of the vehicle 1.

The ECUs 22 and 23 control detection units 41 to 43 that detect the situation surrounding the vehicle, and perform information processing on their detection results. Each detection unit 41 is a camera for shooting an image ahead of the vehicle 1 (which may hereinafter be referred to as "camera 41"), and, in this embodiment, is installed at a roof front part on an interior side of the front window of the vehicle 1. By analyzing an image shot by a camera 41, it is possible to extract the contour of a target object and a demarcation line (white line, for example) of a traffic lane on a road.

Each detection unit 42 is a LIDAR (Light Detection and Ranging, may hereinafter be referred to as "LIDAR 42"), detects a target object in the surroundings of the vehicle 1, and measures the distance from the target object. In this embodiment, five LIDARs 42 are provided, two of the five LIDARs 42 being provided at the respective front corners of the vehicle 1, one at the rear center, and two on the respective sides at the rear. Each detection unit 43 is a millimeter-wave radar (which may hereinafter be referred to as "radar 43"), detects a target object in the surroundings of the vehicle 1, and measures the distance from the target object. In this embodiment, five radars 43 are provided, one of the radars 43 being provided at the front center of the vehicle 1, two at the respective front corners, and two at the rear corners.

The ECU 22 controls one camera 41 and the LIDARs 42, and performs information processing on their detection results. The ECU 23 controls the other camera 41 and the radars 43, and performs information processing on their detection results. By providing two sets of apparatuses that detect the surrounding situation of the vehicle, the reliability of detection results can be improved, and by providing detection units of different types such as cameras, LIDARs, radars, and sonars, the surrounding environment of the vehicle can be multilaterally analyzed.

The ECU 24 controls a gyro sensor 5, a GPS sensor 24b, and a communication apparatus 24c, and performs information processing on their detection results or communication results. The gyro sensor 5 detects rotary movement of the vehicle 1. A course of the vehicle 1 can be determined based on a detection result of the gyro sensor 5, a wheel speed, and the like. The GPS sensor 24b detects the current position of the vehicle 1. The communication apparatus 24c wirelessly communicates with a server that provides map information and traffic information, and acquires such information. The ECU 24 can access a database 24a of map information built in a memory, and the ECU 24 searches for a route from the current location to a destination, and the like. The ECU 24, the map database 24a, and the GPS sensor 24b constitute a so-called navigation apparatus.

The ECU 25 includes a communication apparatus 25a for inter-vehicle communication. The communication apparatus 25a wirelessly communicates with another vehicle in the surroundings thereof, and exchanges information with the vehicle.

The ECU 26 controls a power plant 6. The power plant 6 is a mechanism for outputting drive force for rotating the drive wheels of the vehicle 1, and includes an engine and a transmission, for example. For example, the ECU 26 controls output of the engine in accordance with a driver's driving operation (an accelerator operation or an accelerating operation) detected by an operation detection sensor 7a provided on an accelerator pedal 7A, and switches the gear stage of the transmission based on information regarding the vehicle speed or the like detected by a vehicle speed sensor 7c. When the driving state of the vehicle 1 is an automated driving state, the ECU 26 automatically controls the power plant 6 in accordance with an instruction from the ECU 20, and controls the acceleration/deceleration of the vehicle 1.

The ECU 27 controls lighting devices (lights such as headlights and taillights) that include direction indicators 8 (blinkers). In the example in FIG. 1, direction indicators 8 are provided on door mirrors, at the front, and at the rear of the vehicle 1.

The ECU 28 controls an input/output apparatus 9. The input/output apparatus 9 outputs information to the driver, and receives information input by the driver. An audio output apparatus 91 notifies the driver of information using sound. A display apparatus 92 notifies the driver of information through image display. The display apparatus 92 is installed in front of the driver's seat, for example, and constitutes an instrument panel, or the like. Note that, here, sound and display are illustrated, but information may be notified using vibration and light. In addition, information may also be notified using a combination of some of sound, display, vibration, and light. Furthermore, the combination or a notification aspect may be different according to the level of information to be notified (for example, an emergency level). An input apparatus 93 is a group of switches that is disposed at a position where the driver can operate the switches and gives instructions to the vehicle 1, but a sound input apparatus may also be included.

The ECU 29 controls a brake apparatus 10 and a parking brake (not illustrated). The brake apparatus 10 is, for example, a disk brake apparatus, is provided for each of the wheels of the vehicle 1, and decelerates or stops the vehicle 1 by imposing resistance to rotation of the wheels. The ECU 29 controls activation of the brake apparatus 10, for example, in accordance with a driver's driving operation (brake operation) detected by an operation detection sensor 7b provided on a brake pedal 7B. When the driving state of the vehicle 1 is an automated driving state, the ECU 29 automatically controls the brake apparatus 10 in accordance with an instruction from the ECU 20, and controls deceleration and stop of the vehicle 1. The brake apparatus 10 and the parking brake can also be activated to maintain a stopped state of the vehicle 1. In addition, if the transmission of the power plant 6 includes a parking lock mechanism, this can also be activated in order to maintain a stopped state of the vehicle 1.

Figure 2:
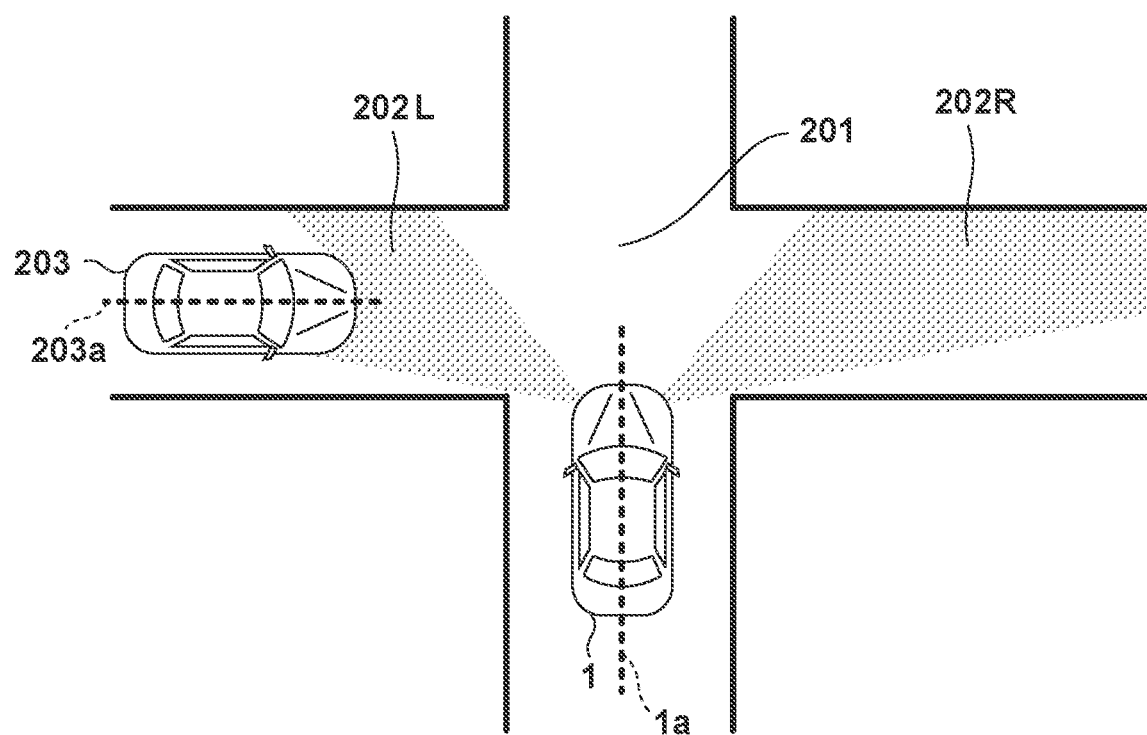
FIG. 2 is a schematic diagram illustrating a collision avoidance function according to an embodiment of the present disclosure.

A collision avoidance function that can be executed by the control apparatus 2 of the vehicle 1 will be described with reference to FIG. 2. Assume that, as shown in FIG. 2, the vehicle 1 is about to enter an intersection 201. The vehicle 1 can detect an object included in a detection region 202L, using the detection unit 43 (the radar 43) mounted on the front left side of the vehicle 1. Also, the vehicle 1 can detect an object included in the detection region 202R, using the detection unit 43 (the radar 43) on the front right side of the vehicle 1.

When it is detected that an object is included in the detection region 202L or 202R, the control apparatus 2 determines whether or not there is the possibility that this object will collide with the vehicle 1. For example, the control apparatus 2 may determine that there is the possibility that the detected object will collide with the vehicle 1 if the object moves in a direction intersecting a longer direction 1a of the vehicle 1. The control apparatus 2 may also determine the possibility of collision further based on the speed of the vehicle 1 and the speed of the object. The longer direction 1a of the vehicle 1 may also be referred to as the front-and-rear direction of the vehicle 1.

For example, assume that, in the example in FIG. 2, a vehicle 203 is also travelling toward the intersection 201. The control apparatus 2 of the vehicle 1 detects that the vehicle 203 is included in the detection region 202L. Since a longer direction 203a of the vehicle 203 intersects the longer direction 1a of the vehicle 1, the control apparatus 2 determines that there is the possibility that the vehicle 1 will collide with the vehicle 203.

If it is determined that there is the possibility that the vehicle 1 will collide with another object, the control apparatus 2 executes an operation for avoiding collision with the vehicle 203 (hereinafter, referred to as a "collision avoidance operation"). Specifically, the control apparatus 2 may alert the driver that there is the possibility of colliding with the vehicle 203, using the display apparatus 92, as the collision avoidance operation. Alternatively or in addition, the control apparatus 2 may decrease the speed of the vehicle 1 by causing the brake apparatus 10 to operate. When alerting the driver on the possibility of collision, the control apparatus 2 may also present, to the driver, the position of the detected object (for example, right or left) and the type of the detected object (for example, a vehicle, a person, a bicycle).

In the example in FIG. 2, the vehicle 203 is used as an example of an object that is to be avoided. Alternatively, an object that is to be avoided may be another object such as a person or a bicycle. In the example in FIG. 2, the object included in the detection region 202L is detected by the radar 43. Alternatively, the object included in the detection region 202L may also be detected using a LIDAR or a camera, or any combination of a LIDAR, a camera and a radar. The same apples to the detection region 202R A method for determining a vehicle as a target for a collision avoidance operation according to some embodiments of the present disclosure will be described with reference to FIGS. 3A and 3B. In the following description, it is assumed that left-side driving is stipulated in traffic regulations. In a case where right-side driving is stipulated, left and right are reversed the following description.

Figure 3A:
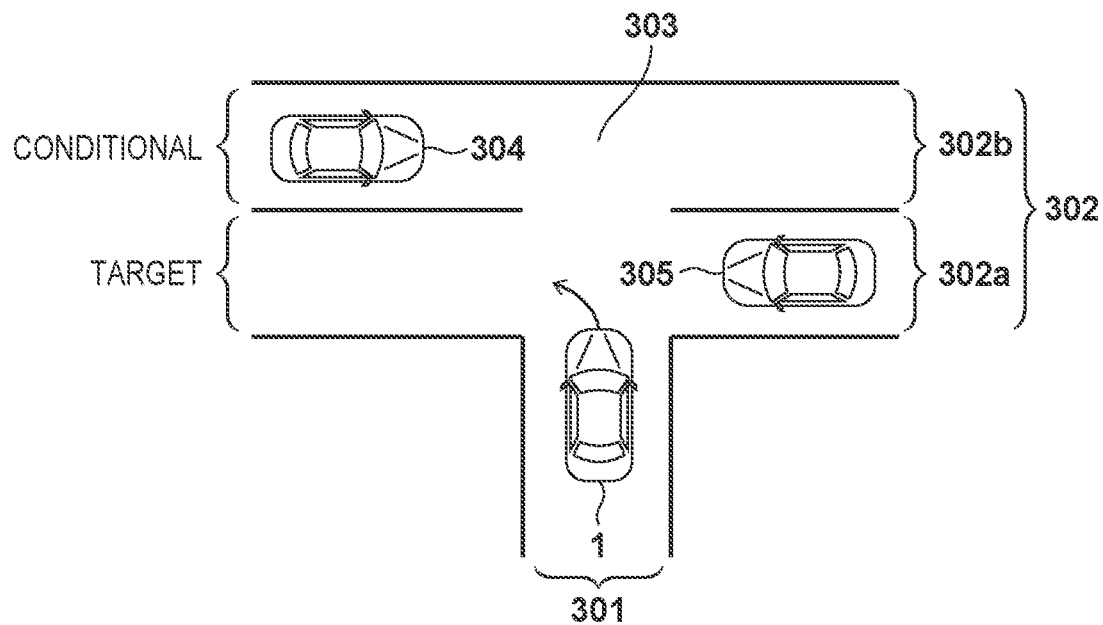
FIGS. 3A and 3B are diagrams illustrating a method for performing a determination on a target traffic lane according to an embodiment of the present disclosure.
Figure 3B:
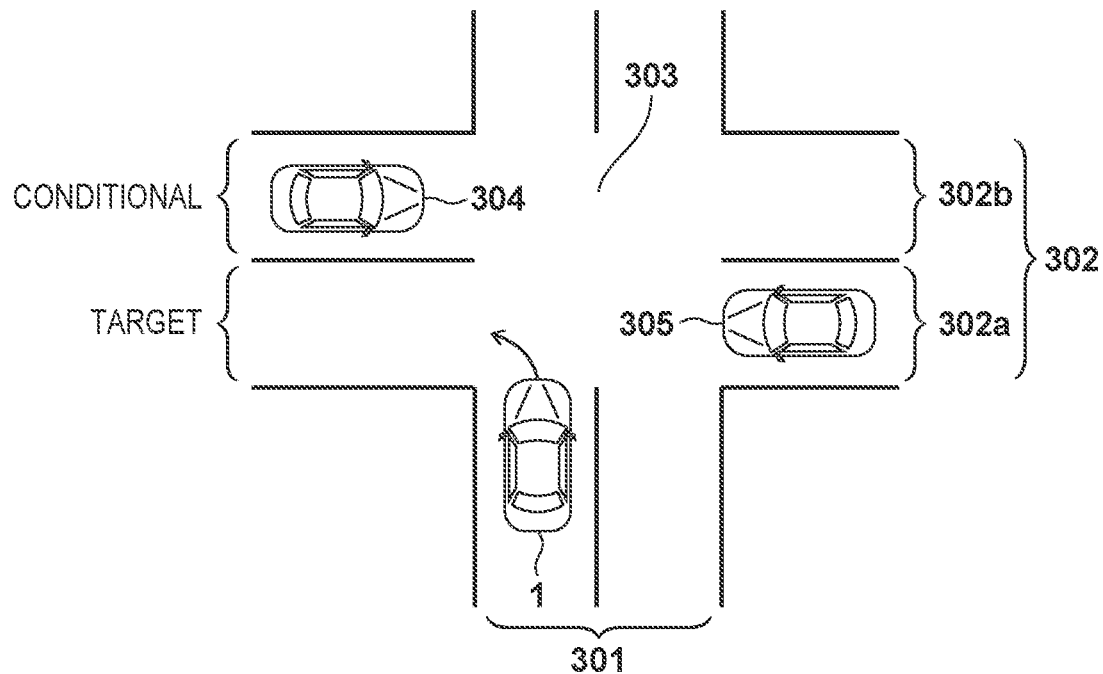

Assume that the vehicle 1 travelling on the road 301 is about to enter an intersection 303. The road 301 intersects a road 302 at the intersection 303. The intersection 303 may be a T-junction as shown in FIG. 3A, or may also be a crossroad as shown in FIG. 3B. In embodiments to be described later, the intersection 303 is a T-junction, but, also in these embodiments, the intersection 303 may be a crossroad.

The road 302 is made up of two traffic lanes 302a and 302b. The traffic lane 302a is a traffic lane that is closer to the vehicle 1 out of the two traffic lanes of the road 302. The traffic lane 302b is a traffic lane that is farther from the vehicle 1 than the traffic lane 302a. The traffic lane 302b is a traffic lane that is the second closest to the vehicle 1, and is a traffic lane in the opposite direction to the traffic lane 302a. In other words, the traffic lane 302b is the opposite lane to the traffic lane 302a. As described above, the road 302 is a two-way street with one lane in each direction Assume that the vehicle 1 is making a turn at the intersection 303 toward the traffic lane 302a (makes a left turn in the case of left-side driving). In this case, there is the possibility that a vehicle that is travelling on the traffic lane 302a will collide with the vehicle 1, and thus the control apparatus 2 sets the vehicle travelling on the traffic lane 302a (for example, a vehicle 305), as a target for the collision avoidance operation. On the other hand, there is not necessarily the possibility that a vehicle that is travelling on the traffic lane 302b (for example, a vehicle 304) will collide with the vehicle 1. Therefore, if a predetermined condition is satisfied, the control apparatus 2 sets a vehicle travelling on the traffic lane 302b (for example, the vehicle 304), as a target for the collision avoidance operation.

An example of the predetermined condition for setting a vehicle travelling on the traffic lane 302b, as a target for the collision avoidance operation will be described below with reference to FIGS. 4A to 6B. Hereinafter, such a condition is referred to as "traffic lane determination condition". In the following examples, the traffic lane determination condition is based on the shape of the traffic lane 302a. The traffic lane determination condition may be determined in advance and stored in the memory 20b.

Figure 4A:
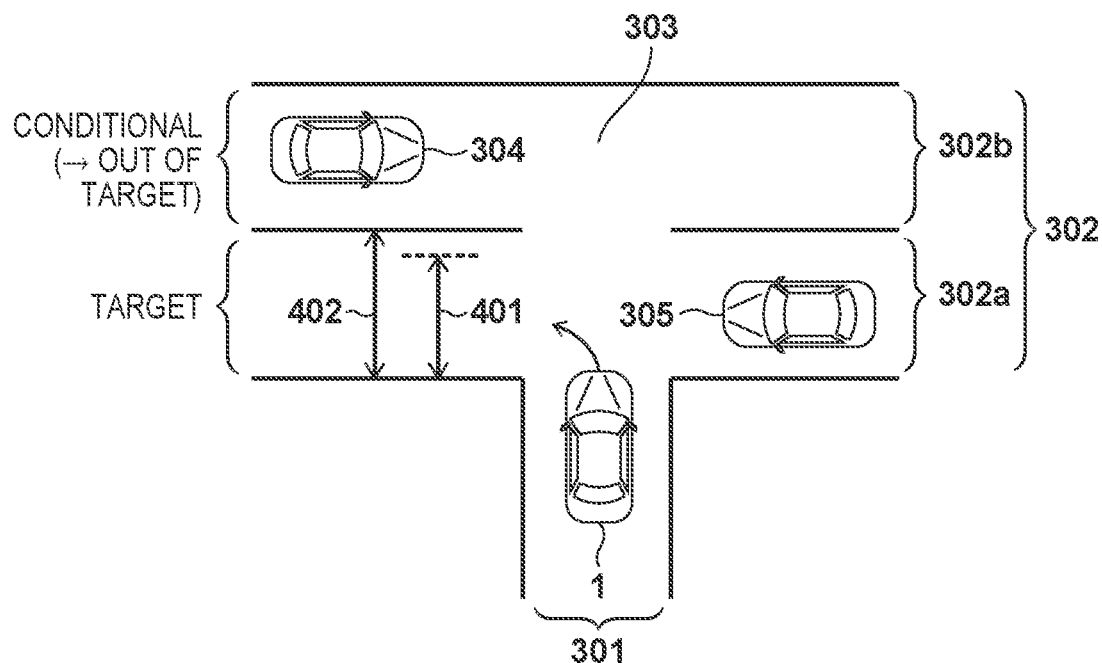
FIGS. 4A and 4B are diagrams illustrating an example of a condition for performing a determination on a target traffic lane according to an embodiment of the present disclosure.
Figure 4B:
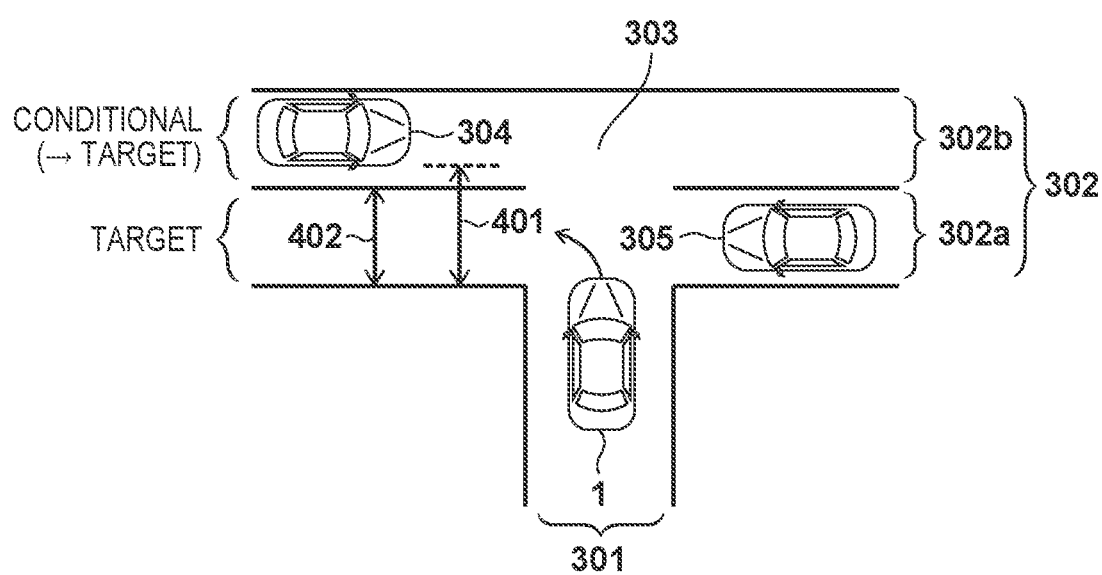

The traffic lane determination condition, which will be described with reference to FIGS. 4A and 4B, is based on the width 402 of the traffic lane 302a. Specifically, as shown in FIG. 4A, in the case where the width 402 of the traffic lane 302a is larger than a threshold value 401, it is unlikely that, when the vehicle 1 make a left turn toward the traffic lane 302a, the vehicle 1 will stray onto the traffic lane 302b that is on the further side. In view of this, the control apparatus 2 does not set a vehicle travelling on the traffic lane 302b (for example, the vehicle 304), as a target for the collision avoidance operation. This threshold value may be 2.5 or 3.0 m, for example. The threshold value may also be determined based on the size and turning ability of the vehicle 1. The threshold value may be determined in advance and stored in the memory 20b.

On the other hand, as shown in FIG. 4B, in the case where the width 402 of the traffic lane 302a is smaller than the threshold value 401, when the vehicle 1 makes a left turn toward the traffic lane 302a, there is the possibility that that the vehicle 1 will stray onto the traffic lane 302b that is on the further side. In view of this, the control apparatus 2 sets a vehicle that is travelling on the traffic lane 302b (for example, the vehicle 304) as a target for the collision avoidance operation. In this manner, in the example in FIG. 4A and 4B, the traffic lane determination condition includes the width of the traffic lane 302a being smaller than the threshold value 401.

Figure 5A:
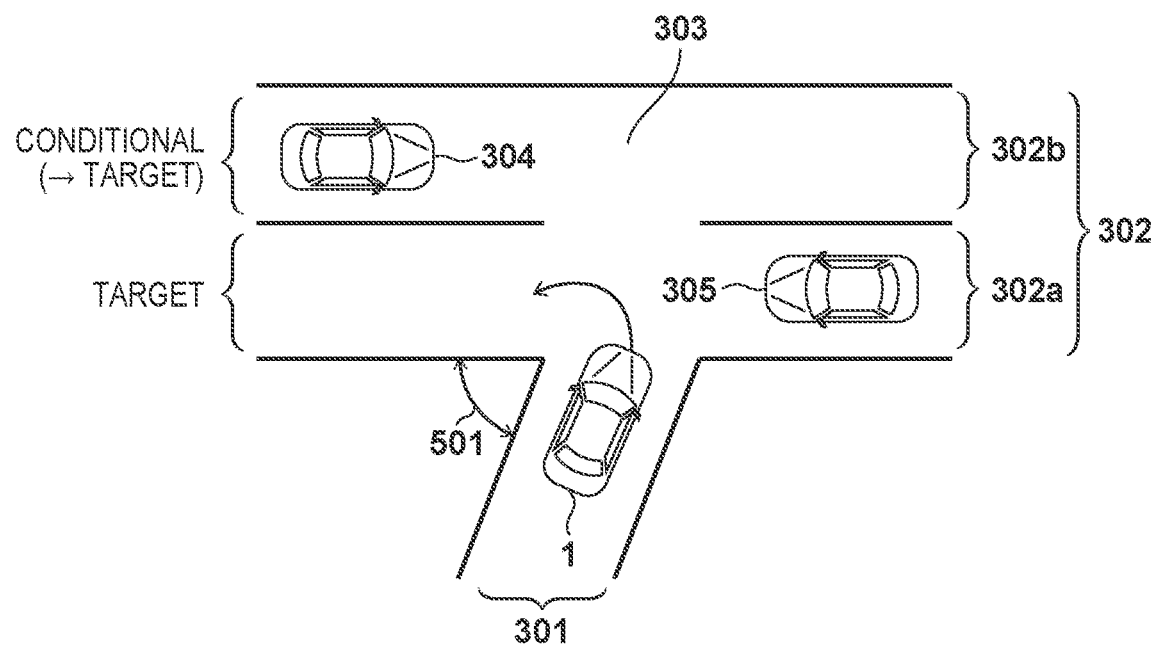
FIGS. 5A and 5B are diagrams illustrating another example of the condition for performing a determination on a target traffic lane according to an embodiment of the present disclosure.
Figure 5B:
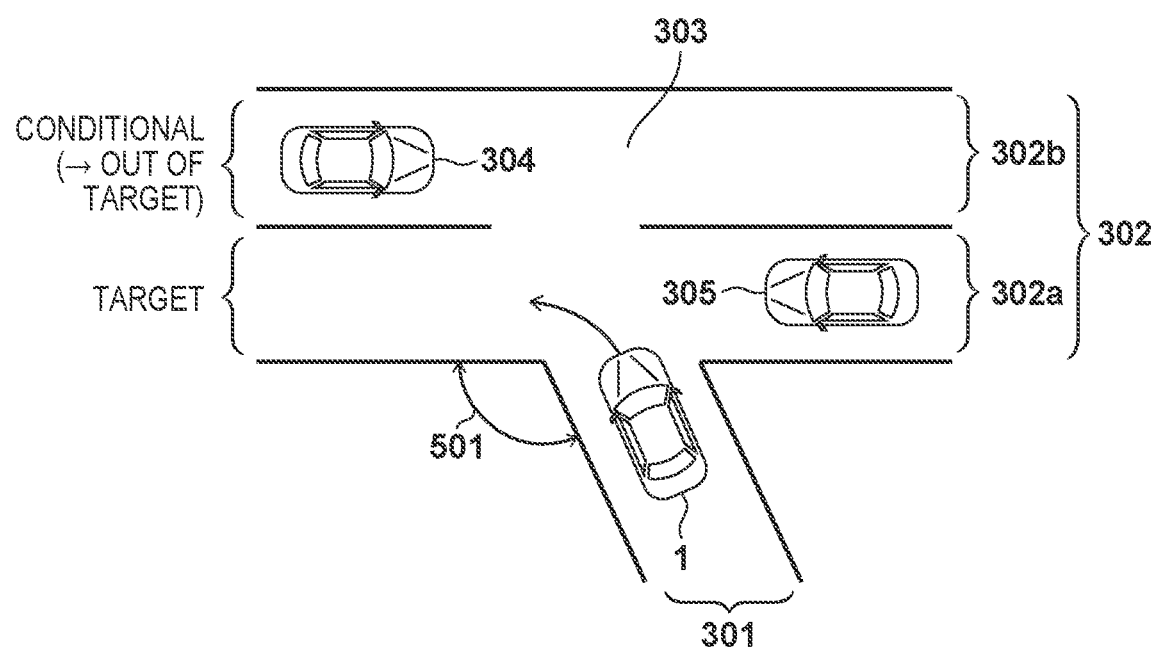

The traffic lane determination condition, which will be described with reference to FIGS. 5A and 5B, is based on an angle at which the vehicle 1 makes a turn toward the traffic lane 302a. The angle at which the vehicle 1 makes a turn toward the traffic lane 302a is an angle formed by a portion of the road 301 in which the vehicle 1 is travelling and a portion of the traffic lane 302a in which the vehicle 1 is expected to be travelling as shown in FIGS. 5A and 5B.

Specifically, as shown in FIG. 5A, in a case where an angle 501 at which the vehicle 1 makes a turn toward the traffic lane 302a is an acute angle, there is the possibility that the vehicle 1 will stray onto the traffic lane 302b that is on the further side. In view of this, the control apparatus 2 sets a vehicle that is travelling on the traffic lane 302b (for example, the vehicle 304), as a target for the collision avoidance operation.

On the other hand, as shown in FIG. 5B, in a case where the angle 501 at which the vehicle 1 makes a turn toward the traffic lane 302a is an obtuse angle, it is unlikely that the vehicle 1 will stray onto the traffic lane 302b that is on the further side. In view of this, the control apparatus 2 does not set a vehicle that is travelling on the traffic lane 302b (for example, the vehicle 304), as a target for the collision avoidance operation. In the case where the angle 501 at which the vehicle 1 makes a turn toward the traffic lane 302a is a right angle, the control apparatus 2 may or may not set the vehicle that is travelling on the traffic lane 302b (for example, the vehicle 304) as a target for the collision avoidance operation. In this manner, in the example in FIG. 5B, the traffic lane determination condition includes an angle at which the vehicle 1 makes a turn toward the traffic lane 302a being an acute angle.

Figure 6A:
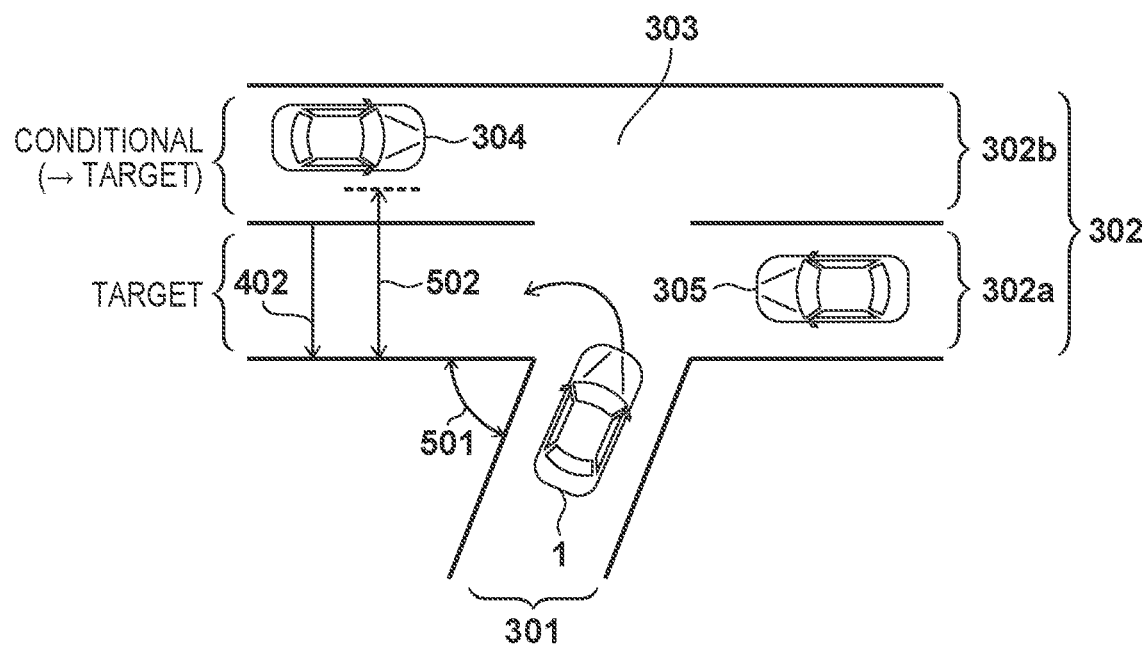
FIGS. 6A and 6B are diagrams illustrating yet another example of the condition for performing a determination on a target traffic lane according to an embodiment of the present disclosure.
Figure 6B:
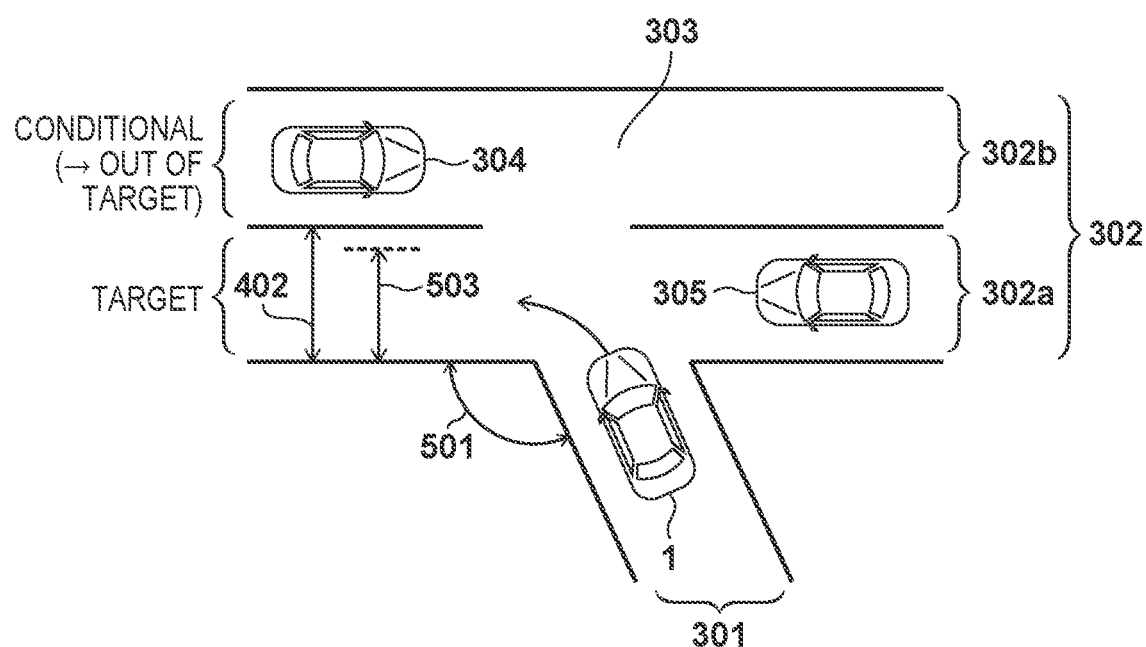

The traffic lane determination condition, which will be described with reference to FIGS. 6A and 6B, is based on both the angle 501 at which the vehicle 1 makes a turn toward the traffic lane 302a and the width 402 of the traffic lane 302a. Specifically, as shown in FIG. 6A, in a case where the angle 501 at which the vehicle 1 makes a turn toward the traffic lane 302a is an acute angle, the control apparatus 2 compares the width 402 of the traffic lane 302a with a threshold value 502. If the width 402 of the traffic lane 302a is smaller than the threshold value 502 (in the case of FIG. 6A), the control apparatus 2 sets a vehicle that is travelling on the traffic lane 302b (for example, the vehicle 304), as a target for the collision avoidance operation. On the other hand, if the width 402 of the traffic lane 302a is larger than the threshold value 502, the control apparatus 2 does not set a vehicle that is travelling on the traffic lane 302b (for example, the vehicle 304), as a target for the collision avoidance operation. In the case where the width 402 of the traffic lane 302a is equal to the threshold value 502, the control apparatus 2 may or may not set a vehicle that is travelling on the traffic lane 302b (for example, the vehicle 304), as a target for the collision avoidance operation. In this manner, the traffic lane determination condition includes the width 402 of the traffic lane 302a being smaller than the threshold value 502 in a case where the angle 501 at which the vehicle 1 makes a turn toward the traffic lane 302a is an acute angle.

As shown in FIG. 6B, in a case where the angle 501 at which the vehicle 1 makes a turn toward the traffic lane 302a is an obtuse angle, the control apparatus 2 compares the width 402 of the traffic lane 302a with a threshold value 503. If the width 402 of the traffic lane 302a is smaller than the threshold value 503 (the case in FIG. 6A), the control apparatus 2 sets a vehicle that is travelling on the traffic lane 302b (for example, the vehicle 304), as a target for the collision avoidance operation. On the other hand, if the width 402 of the traffic lane 302a is larger than the threshold value 503, the control apparatus 2 does not set a vehicle that is travelling on the traffic lane 302b (for example, the vehicle 304), as a target for the collision avoidance operation. If the width 402 of the traffic lane 302a is equal to the threshold value 503, the control apparatus 2 may or may not set a vehicle that is travelling on the traffic lane 302b (for example, the vehicle 304), as a target for the collision avoidance operation. In this manner, the traffic lane determination condition includes the width 402 of the traffic lane 302a being smaller than the threshold value 503 in the case where the angle 501 at which the vehicle 1 makes a turn toward the traffic lane 302a is an obtuse angle.

In the case where the angle 501 is an acute angle as shown in FIG. 6A, the vehicle 1 is likely to veer toward the traffic lane 302b compared with the case where the angle 501 is an obtuse angle as shown in FIG. 6B. Therefore, the threshold value 502 is set to a value larger than the threshold value 503. In addition, as shown in FIG. 4A, the threshold value 401 in the case where the angle 501 is a right angle may also be a value between the threshold value 502 and the threshold value 503. For example, if the threshold value 401 is 3.0 m, the threshold value 502 may be 3.5 m, and the threshold value 503 may be 2.5 m. Furthermore, the threshold values 502 and 503 may also change stepwise in accordance with the angle 501. For example, the threshold value 502 may also change so as to have negative correlation with the angle 501 (such that the smaller the angle 501 is, the larger the threshold value 502 becomes). The threshold value 503 may also change so as to have negative correlation with the angle 501 (the larger the angle 501 is, the smaller the threshold value 503 becomes). The threshold values 502 and 503 may also be determined based on the size and turning ability of the vehicle 1. The threshold values may also be determined in advance and stored in the memory 20b.

As described above, the traffic lane determination condition described with reference to FIGS. 6A and 6B is based on both an angle at which the vehicle 1 makes a turn toward the traffic lane 302a and the width 402 of the traffic lane 302a. In contrast, the traffic lane determination condition described with reference to FIGS. 4A and 4B is based on the width 402 of the traffic lane 302a, and does not need to be based on an angle at which the vehicle 1 makes a turn toward the traffic lane 302a. For example, the threshold value 401 may be constant without being based on the angle at which the vehicle 1 makes a turn toward the traffic lane 302a. The traffic lane determination condition described with reference to FIGS. 5A and 5B is based on an angle at which the vehicle 1 makes a turn toward the traffic lane 302a, and does not need to be based on the width 402 of the traffic lane 302a. For example, if the angle at which the vehicle 1 makes a turn toward the traffic lane 302a is an acute angle, the control apparatus 2 may set the traffic lane 302b as a target, irrespective of the width 402 of the traffic lane 302a.

As described above, in the examples in FIGS. 3A to 6B, a vehicle travelling on the traffic lane 302a is set as a target for the collision avoidance operation by the control apparatus 2 irrespective of whether or not the traffic lane determination condition is satisfied, and a vehicle travelling on the traffic lane 302b is set as a target for the collision avoidance operation if the traffic lane determination condition is satisfied, and a vehicle that is travelling on the traffic lane 302b is not set as a target for the collision avoidance operation if the traffic lane determination condition is not satisfied. Alternatively, a configuration may also be adopted in which the control apparatus 2 sets a vehicle that is travelling on the traffic lane 302a, as a target for the collision avoidance operation irrespective of whether or not the traffic lane determination condition is satisfied, and does not set a vehicle that is travelling on the traffic lane 302b, as a target for the collision avoidance operation irrespective of whether or not the traffic lane determination condition is satisfied. In this case, the control apparatus 2 does not need to perform a determination on the traffic lane determination condition.

In the above embodiment, a case has been described in which the road 302 intersecting the road 301 on which the vehicle 1 is travelling is a two-way street with one lane in each direction. The present disclosure is also applicable in a case where the road 302 is not such a road, for example, a case where the road 302 is made up of three or more traffic lanes. A case in which the road 302 is a two-way street made up of four traffic lanes, namely two lanes in each direction, will be described with reference to FIGS. 7A to 7F. The four traffic lanes are represented as traffic lanes 302c to 302f in order of a lane that is the closest to the vehicle 1. The traffic lane 302c is a traffic lane that is the closest to the vehicle 1. The traffic lane 302d is a traffic lane that is the second closest to the vehicle 1, and is a traffic lane in the same direction as the traffic lane 302c. The traffic lane 302e is a traffic lane that is closer to the vehicle 1 out of two traffic lanes, namely the traffic lanes 302e and 302f in the opposite direction to the traffic lane 302c. The traffic lane 302f is a traffic lane that is farthest from the vehicle 1. In the FIGS. 7A to 7F, arrows in the traffic lanes indicate the traffic directions of the traffic lanes. In a plurality of embodiment below, the traffic lane determination condition may be one of those described with reference to FIG. 4A to 6B. In the following description, a traffic lane identified as a target for the collision avoidance operation if the traffic lane determination condition is satisfied is not set as a target for the collision avoidance operation if the traffic lane determination condition is not satisfied.

Figure 7A:
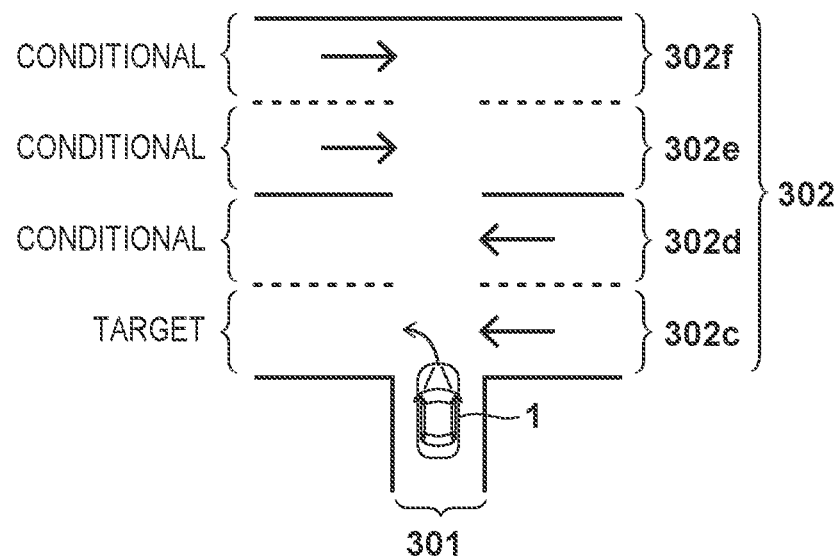
FIGS. 7A to 7F are diagrams illustrating an example in which a crossroad includes three or more traffic lanes according to an embodiment of the present disclosure.

In the embodiment shown in FIG. 7A, the vehicle 1 makes a left turn toward the traffic lane 302c that is the closest to the vehicle 1. The control apparatus 2 sets a vehicle travelling on the traffic lane 302c, as a target for the collision avoidance operation irrespective of whether or not the traffic lane determination condition is satisfied. In addition, the control apparatus 2 sets, as a target for the collision avoidance operation, a vehicle that is travelling on a traffic lane other than the traffic lane 302c, namely the traffic lane 302d, 302e or 302f, if the traffic lane determination condition is satisfied. According to this embodiment, determinations are performed all at once on whether or not the traffic lanes other than the closest traffic lane 302c are set as targets for collision avoidance.

Figure 7B:
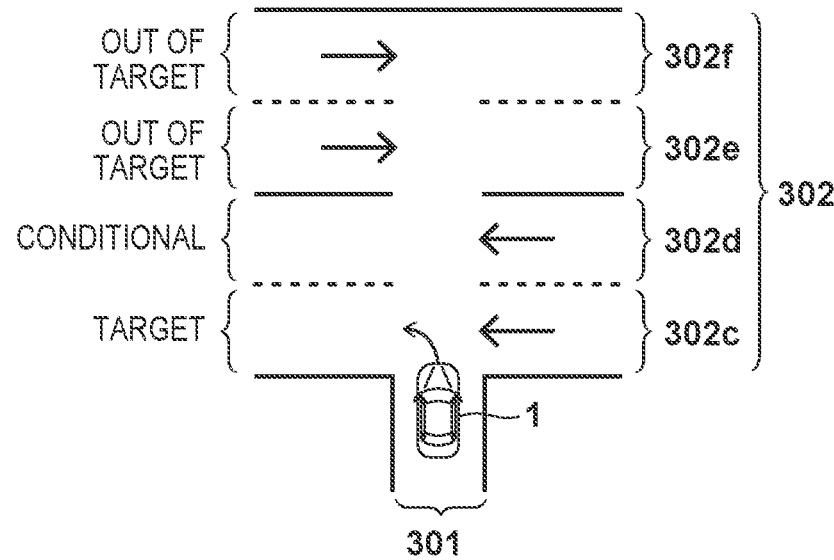

In the embodiment shown in FIG. 7B, the vehicle 1 makes a left turn toward the traffic lane 302c that is the closest to the vehicle 1. The control apparatus 2 sets a vehicle that is travelling on the traffic lane 302c, as a target for the collision avoidance operation irrespective of whether or not the traffic lane determination condition is satisfied. In addition, the control apparatus 2 sets a vehicle that is travelling on the traffic lane 302d that is the second closest to the vehicle 1, as a target for the collision avoidance operation if the traffic lane determination condition is satisfied. Furthermore, the control apparatus 2 does not set vehicles travelling on the traffic lane 302e and 302f that are opposite lanes to the traffic lane 302c, as targets for the collision avoidance operation, irrespective of whether or not the traffic lane determination condition is satisfied. In other words, the control apparatus 2 does not set vehicles travelling on the traffic lanes 302e and 302f that are farther from the vehicle 1 than the traffic lane 302d that is the second closest to the vehicle 1, as targets for the collision avoidance operation irrespective of whether or not the traffic lane determination condition is satisfied. In the case of a road with a plurality of traffic lanes in each direction, it is unlikely that the vehicle 1 will stray onto a traffic lane that is an opposite lane to the closest traffic lane 302c, and thus, according to this embodiment, such a traffic lane is never set as a target.

Figure 7C:
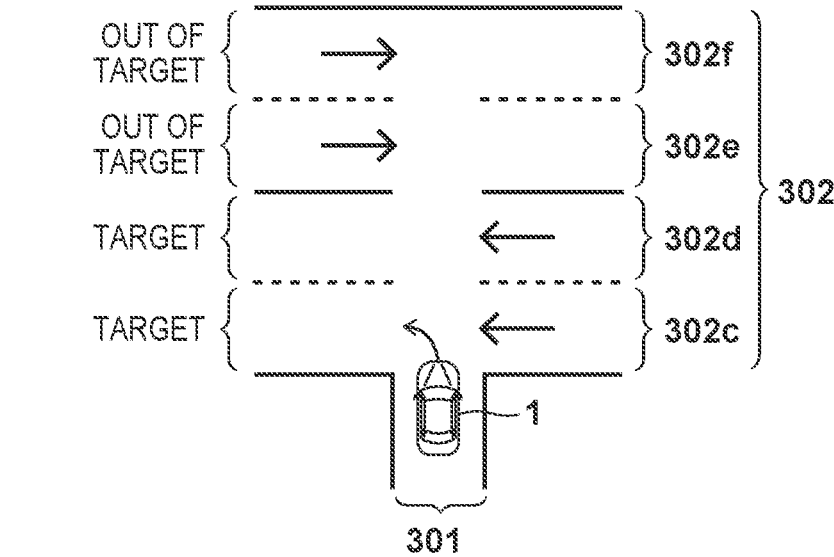

In the embodiment shown in FIG. 7C, the vehicle 1 makes a left turn toward the traffic lane 302c that is the closest to the vehicle 1. The control apparatus 2 sets a vehicle that is travelling on the traffic lane 302c or the traffic lane 302d in the same direction as the traffic lane 302c, as a target for the collision avoidance operation irrespective of whether or not the traffic lane determination condition is satisfied. In addition, the control apparatus 2 does not set a vehicle that is travelling on the traffic lane 302e or 302f in the opposite direction to the traffic lane 302c, as a target for the collision avoidance operation irrespective of whether or not traffic lane determination condition is satisfied. According to this embodiment, a determination is performed on whether or not to set a target for a collision avoidance operation, for each direction of a traffic lane.

Figure 7D:
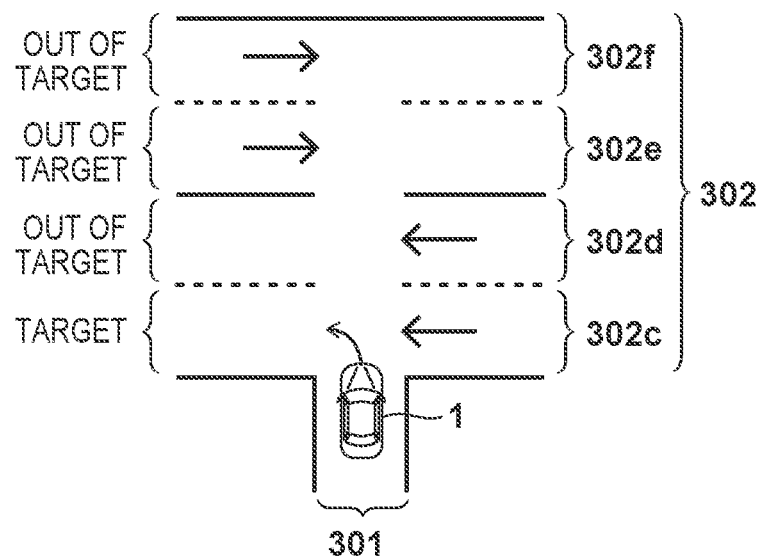

In the embodiment shown in FIG. 7D, the vehicle 1 makes a left turn toward the traffic lane 302c that is the closest to the vehicle 1. The control apparatus 2 sets a vehicle that is travelling on the traffic lane 302c, as a target for the collision avoidance operation irrespective of whether or not the traffic lane determination condition is satisfied. In addition, the control apparatus 2 does not set a vehicle that is travelling on a traffic lane other than the traffic lane 302c, namely the traffic lane 302d, 302e, or 302f, as a target for the collision avoidance operation irrespective of whether or not the traffic lane determination condition is satisfied. According to this embodiment, only a traffic lane toward which the vehicle 1 makes a turn is set as a target for the collision avoidance operation.

Figure 7E:
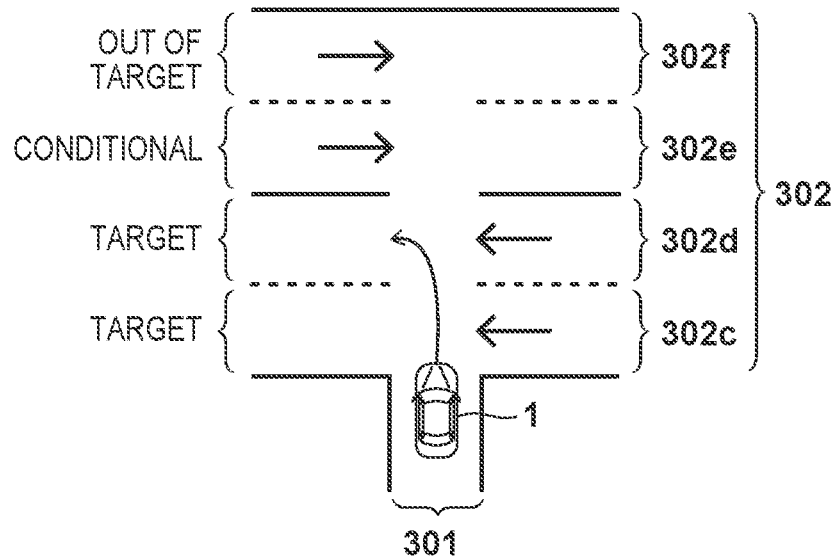

In the embodiment shown in FIG. 7E, the vehicle 1 makes a left turn toward the traffic lane 302d that is the second closest to the vehicle 1. The control apparatus 2 sets a vehicle that is travelling on the traffic lane 302d, as a target for the collision avoidance operation, irrespective of whether or not the traffic lane determination condition is satisfied. In addition, the control apparatus 2 sets a vehicle that is travelling on the traffic lane 302e that is the closest to the vehicle 1 after the traffic lane 302d, as a target for the collision avoidance operation if the traffic lane determination condition is satisfied. Furthermore, the control apparatus 2 does not set a vehicle that is travelling on the traffic lane 302f that is farther from the vehicle 1 than the traffic lane 302e, as a target for the collision avoidance operation irrespective of whether or not the traffic lane determination condition is satisfied. In addition, the control apparatus 2 sets a vehicle that is travelling on the traffic lane 302c that is closer to the vehicle 1 than the traffic lane 302d, as a target for the collision avoidance operation irrespective of whether or not the traffic lane determination condition is satisfied. According to this embodiment, the traffic lane 302c that the vehicle 1 is to travel across is set as a target for the collision avoidance operation irrespective of whether or not the traffic lane determination condition is satisfied.

Figure 7F:
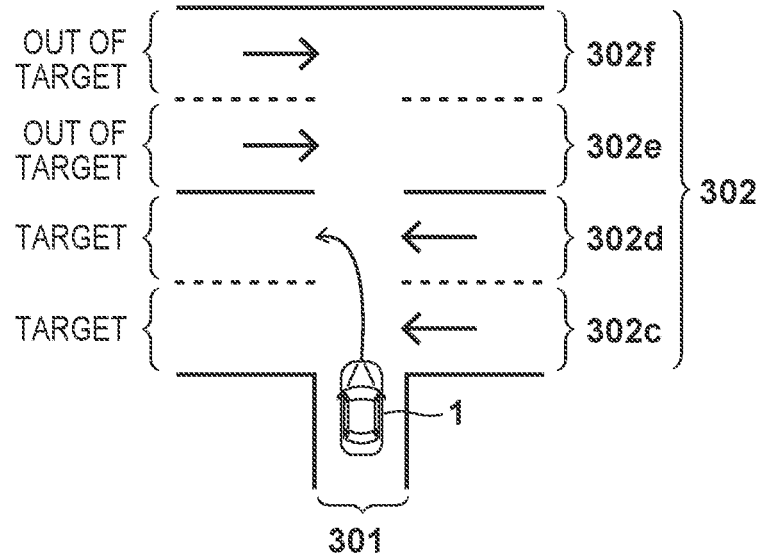

In the embodiment shown in FIG. 7F, the vehicle 1 makes a left turn toward the traffic lane 302d that is the second closest to the vehicle 1. The control apparatus 2 sets a vehicle that is travelling on the traffic lane 302d, as a target for the collision avoidance operation irrespective of whether or not the traffic lane determination condition is satisfied. In addition, the control apparatus 2 does not set a vehicle that is travelling on the traffic lane 302e and 302f that are farther from the vehicle 1 than the traffic lane 302d, as a target for the collision avoidance operation irrespective of whether or not the traffic lane determination condition is satisfied. Furthermore, the control apparatus 2 sets a vehicle that is travelling on the traffic lane 302c that is closer to the vehicle 1 than the traffic lane 302d, as a target for the collision avoidance operation irrespective of whether or not the traffic lane determination condition is satisfied. According to this embodiment, the traffic lane 302c that the vehicle 1 is to travel across is set as a target for the collision avoidance operation irrespective of whether or not the traffic lane determination condition is satisfied. In addition, it is conceivable that, in the case where the vehicle 1 makes a turn toward the second lane, namely the traffic lane 302*d*, it is unlikely that the vehicle 1 will stray onto the traffic lane 302*e*, irrespective of the width or the angle of the traffic lane 302*c*. Therefore, a traffic lane that is on the further side relative to the traffic lane 302*d* is not set as a target irrespective of whether or not the traffic lane determination condition is satisfied.

The embodiments in FIGS. 7A to 7F can be carried out in combination as appropriate. For example, the embodiment in FIG. 7B and the embodiment in FIG. 7F may be combined. In this combination, in a case where the vehicle 1 makes a turn toward the traffic lane 302*c* that is the closest to the vehicle 1 from among the plurality of traffic lanes of the road 302, the control apparatus 2 sets a vehicle that is travelling on the traffic lane 302*d*, as a target for the collision avoidance operation if the traffic lane determination condition is satisfied. In addition, in a case where the vehicle 1 makes a turn toward a traffic lane other than the traffic lane 302*c* that is the closest to the vehicle 1 from among the plurality of traffic lanes of the road 302, the control apparatus 2 does not set a vehicle that is travelling on a traffic lane that is farther from the vehicle 1 than the traffic lane toward which the vehicle 1 makes a turn, as a target for the collision avoidance operation irrespective of whether or not the traffic lane determination condition is satisfied.

Figure 8A:
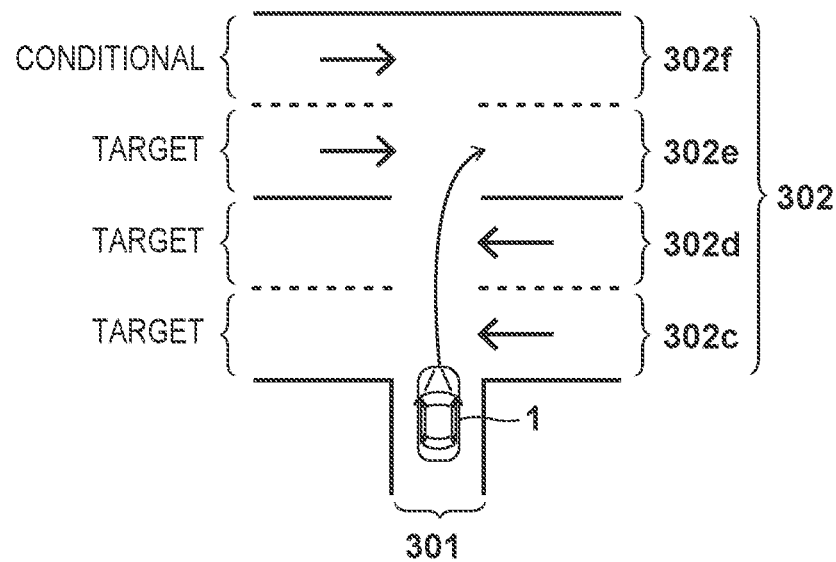
FIGS. 8A to 8D are diagrams illustrating an example of making a right turn at a crossroad according to an embodiment of the present disclosure.
Figure 8B:
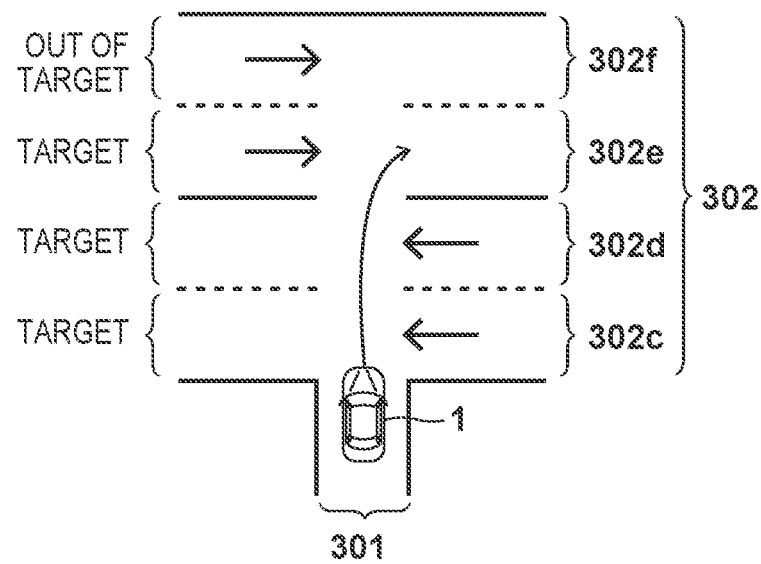
Figure 8C:
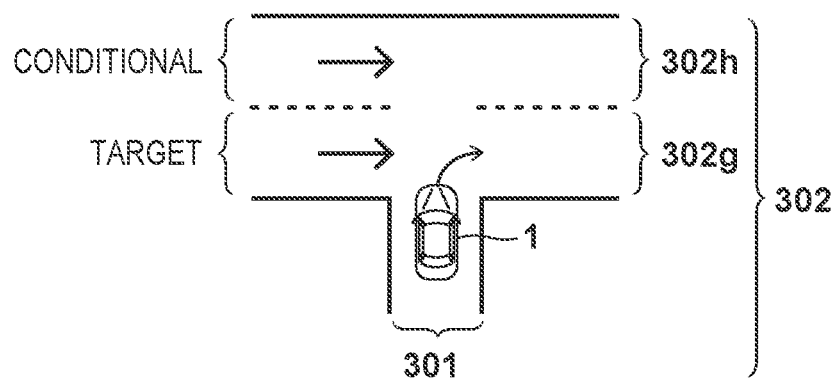
Figure 8D:
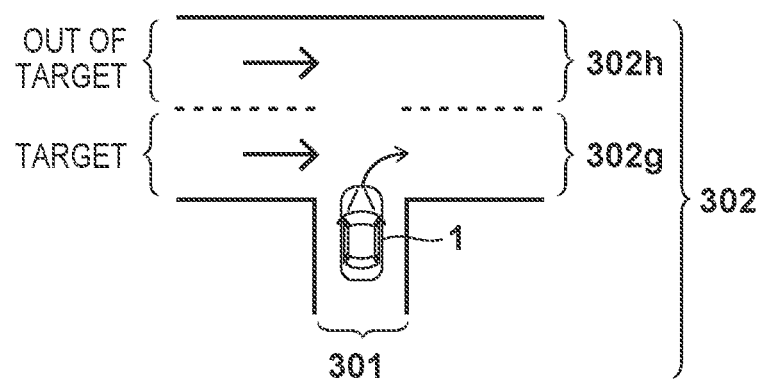

In above embodiments, cases have been described in which the vehicle 1 makes a left turn at an intersection. The present disclosure is also applicable to a case where the vehicle 1 makes a right turn at an intersection. Cases where the vehicle 1 makes a right turn at an intersection will be described with reference to FIGS. 8A to 8D. In FIGS. 8A and 8B, the road 302 includes traffic lanes similar to those in FIGS. 7A to 7F. In FIGS. 8C and 8D, the road 302 is a one-way street with two lanes. The two traffic lanes are represented as traffic lanes 302*g* and 302*h* in the order of a lane that is the closest to the vehicle 1. The traffic lane 302*g* is a traffic lane that is the closest to the vehicle 1. The traffic lane 302*h* is a traffic lane that is the second closest to the vehicle 1, and is a traffic lane in the same direction as the traffic lane 302*g*. In FIGS. 8A to 8D, arrows in the traffic lanes indicate the traffic directions of the traffic lanes. In a plurality of embodiment below, the traffic lane determination condition may be one of those described with reference to FIG. 4A to 6B. In the following description, a traffic lane identified as a target for the collision avoidance operation if the traffic lane determination condition is satisfied is not set as a target for the collision avoidance operation if the traffic lane determination condition is not satisfied.

In the embodiment shown in FIG. 8A, the vehicle 1 makes a right turn toward the traffic lane 302*e*. The control apparatus 2 sets a vehicle that is travelling on the traffic lane 302*e*, as a target for the collision avoidance operation irrespective of whether or not the traffic lane determination condition is satisfied. In addition, the control apparatus 2 sets a vehicle that is travelling on the traffic lane 302*f* that is farther from the vehicle 1 than the traffic lane 302*e*, as a target for the collision avoidance operation if the traffic lane determination condition is satisfied. Furthermore, the control apparatus 2 sets a vehicle that is travelling on the traffic lanes 302*c* and 302*d* that are closer to the vehicle 1 than the traffic lane 302*e*, as a target for the collision avoidance operation irrespective of whether or not the traffic lane determination condition is satisfied. According to this embodiment, the traffic lanes 302*c* and 302*d* that the vehicle 1 travels across are set as targets for the collision avoidance operation irrespective of whether or not the traffic lane determination condition is satisfied.

In the embodiment shown in FIG. 8B, the vehicle 1 makes a right turn toward the traffic lane 302*e*. The control apparatus 2 sets a vehicle that is travelling on the traffic lane 302*e*, as a target for the collision avoidance operation irrespective of whether or not the traffic lane determination condition is satisfied. In addition, the control apparatus 2 does not set a vehicle that is travelling on the traffic lane 302*f* that is farther from the vehicle 1 than the traffic lane 302*e*, as a target for the collision avoidance operation irrespective of whether or not the traffic lane determination condition is satisfied. Furthermore, the control apparatus 2 sets a vehicle that is travelling on the traffic lane 302*c* and 302*d* that are closer to the vehicle 1 than the traffic lane 302*e*, as a target for the collision avoidance operation irrespective of whether or not the traffic lane determination condition is satisfied. It is conceivable that, in the case where the vehicle 1 makes a turn toward the traffic lane 302*e*, it is unlikely that the vehicle 1 will stray onto the traffic lane 302*f*, irrespective of the width and angle of the traffic lane 302*c*. Therefore, a traffic lane that is on the further side relative to the traffic lane 302*e* is not set as a target, irrespective of whether or not the traffic lane determination condition is satisfied.

In the embodiment shown in FIG. 8C, the vehicle 1 makes a right turn toward the traffic lane 302*g*. The control apparatus 2 sets a vehicle that is travelling on the traffic lane 302*g*, as a target for the collision avoidance operation irrespective of whether or not the traffic lane determination condition is satisfied. In addition, the control apparatus 2 sets a vehicle that is travelling on the traffic lane 302*h* that is farther from the vehicle 1 than the traffic lane 302*g*, as a target for the collision avoidance operation if the traffic lane determination condition is satisfied.

In the embodiment shown in FIG. 8D, the vehicle 1 makes a right turn toward the traffic lane 302*g*. The control apparatus 2 sets a vehicle that is travelling on the traffic lane 302*g*, as a target for the collision avoidance operation irrespective of whether or not the traffic lane determination condition is satisfied. In addition, the control apparatus 2 does not set a vehicle that is travelling on the traffic lane 302*h* that is farther from the vehicle 1 than the traffic lane 302*g*, as a target for the collision avoidance operation irrespective of whether or not the traffic lane determination condition is satisfied.

Next, an example of a method in which the control apparatus 2 controls the vehicle 1 will be described with reference to FIG. 9. The method in FIG. 9 is processed, for example, as a result of the processor 20*a* of the ECU 20 executing an instruction of a program stored in the memory 20*b* of the ECU 20. Alternatively, a configuration may also be adopted in which dedicated hardware (for example, a circuit) execute the steps of the method. This method is started in accordance with the vehicle 1 starting travelling. During the operation in FIG. 9, the vehicle 1 may be travelling through manual driving, or may also be travelling through automated driving.

In step S901, the control apparatus 2 determines whether or not the vehicle 1 is about to make a turn at intersection. If the vehicle 1 is about to make a turn at an intersection (YES in step S901), the control apparatus 2 advances the procedure to step S902, otherwise (NO in step S901) repeats step S901. For example, the control apparatus 2 determines that there is an intersection in front of the vehicle 1, based on map information and detection results of the detection units 41 to 43. Furthermore, the control apparatus 2 determines whether or not the vehicle 1 will make a (right or left) turn at this intersection, based on input on a direction indicator 8 (in the case of manual driving) and a planned route (in the case of manual driving or automated driving).

In step S902, the control apparatus 2 performs determination on a traffic lane targeted for the collision avoidance operation. First, the control apparatus 2 determines the number of traffic lanes and the directions of the traffic lanes of a road intersecting the road on which the vehicle 1 is travelling, based on the map information and the detection results of the detection units 41 to 43. Furthermore, in the case where the traffic lane determination condition is based on a traffic lane width, the control apparatus 2 determines the width of a traffic lane that is the closest to the vehicle 1 from among a plurality of traffic lanes of the road intersecting the road on which the vehicle 1 is travelling. In addition, in the case where the traffic lane determination condition is based on an angle at which the vehicle 1 makes a turn, the control apparatus 2 determines an angle at which the vehicle makes a turn toward a traffic lane that is the closest to the vehicle 1 from among the traffic lanes of the road intersecting the road on which the vehicle is travelling. The control apparatus 2 then performs determination on a traffic lane targeted for the collision avoidance in accordance with one of the traffic lane determination conditions described with reference to FIGS. 4A to 8D.

In step S903, the control apparatus 2 determines whether or not there is a vehicle that is travelling on the target traffic lane and has a possibility of colliding with the vehicle 1. If there is such a vehicle (YES in step S903), the control apparatus 2 advances the procedure to step 5904, otherwise (NO in step S903) advances the procedure to step S905. For example, the control apparatus 2 performs a determination on a vehicle that is travelling on the road intersecting the road on which the vehicle 1 is travelling, based on detection results of the detection units 41 to 43, and determines whether or not the vehicle is travelling on the target traffic lane.

In step S904, the control apparatus 2 performs the collision avoidance operation on the vehicle that has a possibility of colliding with the vehicle 1. For example, as described above, the control apparatus 2 may alert the driver, or may decrease the speed of the vehicle 1.

In step S905, the control apparatus 2 determines whether or not the vehicle 1 has stopped travelling. If the vehicle 1 has stopped travelling (YES in step S905), the control apparatus 2 ends the procedure, otherwise (NO in step S905) advances the procedure to step S901.

Embodiment Overview

Item 1. A control apparatus (2) of a vehicle (1), the apparatus comprising:
  a collision avoidance unit (20) configured to execute an avoidance operation for avoiding collision with an object (203) that is moving in a direction intersecting a longer direction (1*a*) of the vehicle,
  wherein, in a case where the vehicle is travelling on a first road (301), and makes a turn toward a first traffic lane (302*a*, 302*c*, 302*e*, 302*g*) of a second road (302) intersecting the first road,
  the collision avoidance unit does not set a vehicle that is travelling on a second traffic lane of the second road that is farther from the vehicle than the first traffic lane, as a target for the avoidance operation, if a predetermined condition is not satisfied, or irrespective of whether or not the predetermined condition is satisfied, and
  sets a vehicle that is travelling on the first traffic lane, as a target for the avoidance operation, irrespective of whether or not the predetermined condition is satisfied.

According to this embodiment, the collision avoidance operation can be executed in an appropriate case.

Item 2. The control apparatus according to Item 1,
  wherein the predetermined condition is based on an angle (501) at which the vehicle makes a turn toward the first traffic lane.

According to this embodiment, consideration is given to the possibility that the vehicle will stray onto a traffic lane that is on the further side, and thus the collision avoidance operation can be executed in a more appropriate case.

Item 3. The control apparatus according to Item 1,
  wherein the predetermined condition includes an angle at which the vehicle makes a turn toward the first traffic lane being an acute angle.

According to this embodiment, consideration is given to the possibility that the vehicle will stray onto a traffic lane that is on the further side, and thus the collision avoidance operation can be executed in a more appropriate case.

Item 4. The control apparatus according to any one of Items 1 to 3,
  wherein the predetermined condition is based on a width (402) of the first traffic lane.

According to this embodiment, consideration is given to the possibility that the vehicle will stray onto a traffic lane that is on the further side, and thus the collision avoidance operation can be executed in a more appropriate case.

Item 5. The control apparatus according to Item 4,
  wherein the predetermined condition includes the width of the first traffic lane being smaller than a threshold value (401).

According to this embodiment, consideration is given to the possibility that the vehicle will stray onto a traffic lane that is on the further side, and thus the collision avoidance operation can be executed in a more appropriate case.

Item 6. The control apparatus according to any one of Items 1 to 5,
  wherein the predetermined condition is based on both the angle at which the vehicle makes a turn toward the first traffic lane and the width of the first traffic lane.

According to this embodiment, consideration is given to the possibility that the vehicle will stray onto a traffic lane that is on the further side, and thus the collision avoidance operation can be executed in a more appropriate case.

Item 7. The control apparatus according to Item 6,
  wherein the predetermined condition is that:
  the width of the first traffic lane is smaller than a first threshold value (502) in a case where the angle at which the vehicle makes a turn toward the first traffic lane is an acute angle, and
  the width of the first traffic lane is smaller than a second threshold value (503) that is smaller than the first threshold value in a case where the angle at which the vehicle makes a turn toward the first traffic lane is an obtuse angle.

According to this embodiment, consideration is given to the possibility that the vehicle will stray onto a traffic lane that is on the further side, and thus the collision avoidance operation can be executed in a more appropriate case.

Item 8. The control apparatus according to any one of Items 1 to 7,
  wherein the first traffic lane is a traffic lane (302*a*, 302*c*, 302*g*) that is the closest to the vehicle from among a plurality of traffic lanes of the second road.

According to this embodiment, a case is dealt with in which the vehicle makes a turn toward a traffic lane where the vehicle is likely to stray onto a traffic lane on the farther side, and thus the collision avoidance operation can be executed in a more appropriate case.

Item 9. The control apparatus according to Item 8, wherein the second traffic lane is a traffic lane (302d) that is the second closest to the vehicle from among the plurality of traffic lanes of the second road, and the collision avoidance unit sets a vehicle that is travelling on the second traffic lane, as a target for the avoidance operation if the predetermined condition is satisfied.

According to this embodiment, a determination is performed on a condition for a traffic lane that is immediately on the further side and onto which the vehicle may stray, and thus the collision avoidance operation can be executed in a more appropriate case.

Item 10. The control apparatus according to any one of Items 1 to 7, wherein the first traffic lane is a traffic lane that is the closest to the vehicle or a traffic lane in the same direction as the closest traffic lane, from among the plurality of traffic lanes of the second road.

According to this embodiment, a case is dealt with in which the vehicle makes a turn toward a traffic lane where the vehicle is likely to stray onto a traffic lane on the farther side, and thus the collision avoidance operation can be executed in a more appropriate case.

Item 11. The control apparatus according to Item 10, wherein the second traffic lane is a traffic lane (302e) in the opposite direction to the first traffic lane.

According to this embodiment, a determination is performed on whether or not the collision avoidance operation is to be performed on a traffic lane in the opposite direction to the planned movement direction of the vehicle.

Item 12. The control apparatus according to Item 11, wherein the collision avoidance unit sets a vehicle that is travelling on a traffic lane in the same direction as the first traffic lane, from among the plurality of traffic lanes of the second road, as a target for the avoidance operation irrespective of whether or not the predetermined condition is satisfied, and the collision avoidance unit does not set a vehicle that is travelling on a traffic lane in the opposite direction to the first traffic lane, from among the plurality of traffic lanes of the second road, as a target for the avoidance operation irrespective of whether or not the predetermined condition is satisfied.

According to this embodiment, only a traffic lane in the same direction as the planned movement direction of the vehicle is set as a target for the collision avoidance operation.

Item 13. The control apparatus according to any one of Items 1 to 12, wherein, in a case where the first traffic lane is a traffic lane that is the closest to the vehicle from among the plurality of traffic lanes of the second road, the collision avoidance unit sets a vehicle that is travelling on the second traffic lane, as a target for the avoidance operation if the predetermined condition is satisfied, and in a case where the first traffic lane is not a traffic lane that is the closest to the vehicle from among the plurality of traffic lanes of the second road, the collision avoidance unit does not set a vehicle that is travelling on the second traffic lane, as a target for the avoidance operation irrespective of whether or not the predetermined condition is satisfied.

According to this embodiment, a determination is performed on a target for the collision avoidance operation in accordance with a traffic lane toward which the vehicle makes a turn.

Item 14. A vehicle (1) comprising the control apparatus according any one of Items 1 to 13.

According to this embodiment, a vehicle that has the above-described advantages is provided.

The invention is not limited to the foregoing embodiments, and various variations/changes are possible within the spirit of the invention.

What is claimed is:

1. A control apparatus of a vehicle, the apparatus comprising at least one processor circuit with a memory comprising instructions, that when executed by the processor circuit, cause the processor circuit to at least:

execute an avoidance operation for avoiding collision with an object that is moving in a direction intersecting a longer direction of the vehicle, wherein, in a case where the vehicle is travelling on a first road, and makes a turn toward a first traffic lane of a second road intersecting the first road, the instructions further cause the processor circuit to cease to set a vehicle that is travelling on a second traffic lane of the second road that is farther from the vehicle than the first traffic lane, as a target for the avoidance operation, if a predetermined condition is not satisfied, set a vehicle that is travelling on the first traffic lane, as a target for the avoidance operation, irrespective of whether or not the predetermined condition is satisfied, and the predetermined condition is that a width of the first traffic lane is smaller than a first threshold value in a case where an angle at which the vehicle makes a turn toward the first traffic lane is an acute angle, and the width of the first traffic lane is smaller than a second threshold value that is smaller than the first threshold value in a case where the angle at which the vehicle makes a turn toward the first traffic lane is an obtuse angle.

2. The control apparatus according to claim 1, wherein the first traffic lane is a traffic lane that is the closest to the vehicle from among a plurality of traffic lanes of the second road.

3. The control apparatus according to claim 2, wherein the second traffic lane is a traffic lane that is the second closest to the vehicle from among the plurality of traffic lanes of the second road, and the instructions further cause the processor circuit to set a vehicle that is travelling on the second traffic lane, as a target for the avoidance operation if the predetermined condition is satisfied.

4. The control apparatus according to claim 1, wherein the first traffic lane is a traffic lane that is the closest to the vehicle or a traffic lane in the same direction as the closest traffic lane, from among a plurality of traffic lanes of the second road.

5. The control apparatus according to claim 4, wherein the second traffic lane is a traffic lane in the opposite direction to the first traffic lane.

6. The control apparatus according to claim 5, wherein the instructions further cause the processor circuit to set a vehicle that is travelling on a traffic lane in the same direction as the first traffic lane, from among the plurality of traffic lanes of the second road, as a target for the avoidance operation irrespective of whether or not the predetermined condition is satisfied, and the instructions further cause the processor circuit to cease to set a vehicle that is travelling on a traffic lane in the opposite direction to the first traffic lane, from among the plurality of traffic lanes of the second road, as a target for the avoidance operation irrespective of whether or not the predetermined condition is satisfied.

7. The control apparatus according to claim 1,
wherein, in a case where the first traffic lane is a traffic lane that is the closest to the vehicle from among a plurality of traffic lanes of the second road, the instructions further cause the processor circuit to set a vehicle that is travelling on the second traffic lane, as a target for the avoidance operation if the predetermined condition is satisfied, and in a case where the first traffic lane is not a traffic lane that is the closest to the vehicle from among the plurality of traffic lanes of the second road, the instructions further cause the processor circuit to cease to set a vehicle that is travelling on the second traffic lane, as a target for the avoidance operation irrespective of whether or not the predetermined condition is satisfied.

8. A vehicle comprising the control apparatus according to claim 1.

* * * * *